United States Patent [19]

Erdogan et al.

[11] Patent Number: 5,620,496
[45] Date of Patent: Apr. 15, 1997

[54] METHOD OF MAKING STABLE OPTICAL DEVICES EMPLOYING RADIATION-INDUCED INDEX CHANGES

[75] Inventors: Turan Erdogan, Berkeley Heights; Paul J. Lemaire, Madison; Victor Mizrahi, Bedminster; Donald P. Monroe, Berkeley Heights, all of N.J.

[73] Assignee: Lucent Technologies Inc., Murray Hill, N.J.

[21] Appl. No.: 566,650

[22] Filed: Dec. 4, 1995

Related U.S. Application Data

[63] Continuation of Ser. No. 152,120, Nov. 12, 1993, abandoned.

[51] Int. Cl.⁶ .................................................. C03B 37/00
[52] U.S. Cl. ......................... 65/425; 65/29.18; 385/123; 430/290; 430/321
[58] Field of Search ................................ 430/290, 321; 385/123; 359/570; 65/425, 17.1, 24.18

[56] References Cited

U.S. PATENT DOCUMENTS

| | | | |
|---|---|---|---|
| 2,746,193 | 5/1956 | Billian | 65/17.1 |
| 3,542,536 | 11/1970 | Flam | 65/425 |
| 4,777,146 | 10/1988 | Bylsma | 437/4 |
| 5,066,133 | 11/1991 | Brinza | 359/570 |
| 5,218,655 | 6/1993 | Mizrahi | 385/39 |
| 5,235,659 | 8/1993 | Atkins | 385/124 |
| 5,287,427 | 2/1994 | Atkins | 385/124 |

FOREIGN PATENT DOCUMENTS 0569182  4/1993  European Pat. Off. .

OTHER PUBLICATIONS

P.J. Lemaire, et al. "High–temperature Stability of Phase Gratings in GeO$_2$–Doped Optical Fibers", Optical Fiber Communications Conference, Paper FA7, (1993)–Nov.
Photosensitivity and Self–Organization in Optical Fibers and Waveguides, *SPIE –The International Society for Optical Engineering*, vol. 2044 (1993).

*Primary Examiner*—John Hoffmann
*Attorney, Agent, or Firm*—Glen E. Books

[57] ABSTRACT

The present invention is predicated upon the discovery by applicants of a relationship describing thermal decay of radiation-induced index changes and a mechanism which permits stabilization by accelerated aging. Specifically, the induced index change decays in proportion to $1/(1+At^\alpha)$ where A and $\alpha$ are functions of temperature, and the decay can be accelerated by heat treatment. As a consequence, the extent of decay can be determined for arbitrary time and temperature and, significantly, an appropriate heat treatment can be scheduled for making a device stable within predeterminable limits.

5 Claims, 2 Drawing Sheets

5,620,496

METHOD OF MAKING STABLE OPTICAL DEVICES EMPLOYING RADIATION-INDUCED INDEX CHANGES

This application is a continuation of application Ser. No. 08/152120, filed on Nov. 12, 1993 abandoned.

FIELD OF THE INVENTION

This invention relates to optical devices and, in particular, to optical devices employing radiation induced changes in the index of refraction of a glass medium.

BACKGROUND OF THE INVENTION

The application of high intensity radiation to certain glasses, such as germanium doped silicate, gamma irradiated silicate, and europium doped glass, is known to produce a change in the index of refraction in the irradiated region. This phenomenon has application to a wide variety of optical devices. For example, interfering beams of ultraviolet light have been used to induce Bragg phase gratings in optical fibers, and such uv-induced gratings have been employed in fiber lasers, optical filters, polarization converters, mode converters and fiber sensors. Another potential application is fabrication of optical memories.

An impediment to the deployment of devices containing radiation-induced index changes is that not much is known concerning their long term reliability. It is known that the induced index changes diminish with time. But not enough is known to predict the decay at arbitrary time or temperature. Some applications, such as fiber lasers for undersea cable, require high tolerances over long periods of time. Some applications also require operation at elevated temperatures, posing the additional threat of environmental stress. Accordingly, there is a need for making such devices of assured reliability.

SUMMARY OF THE INVENTION

The present invention is predicated upon the discovery by applicants of a relationship describing thermal decay of radiation-induced index changes and a mechanism which permits stabilization by accelerated aging. Empirically, the induced index change decays in proportion to $1/(1+At^\alpha)$ where $A$ and $\alpha$ are functions of temperature, and the decay can be accelerated by heat treatment. As a consequence, the extent of decay can be determined for arbitrary time and temperature and, significantly, an appropriate heat treatment can be scheduled for making a device stable within predeterminable limits.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

DETAILED DESCRIPTION

This description is divided into three parts. Part I qualitatively describes the application of the inventive method to making an exemplary device employing uv-induced index changes, specifically a stable optical fiber laser. Part II describes quantitative aspects of the invention; part III sets forth a theoretical physical model of radiation-induced index changes believed to underlie the invention; and part IV derives from the physical model a quantitative model for device stabilization consistent with the empirical results of Part II.

I. The Method of the Invention (Qualitative Description)

Figure 1:
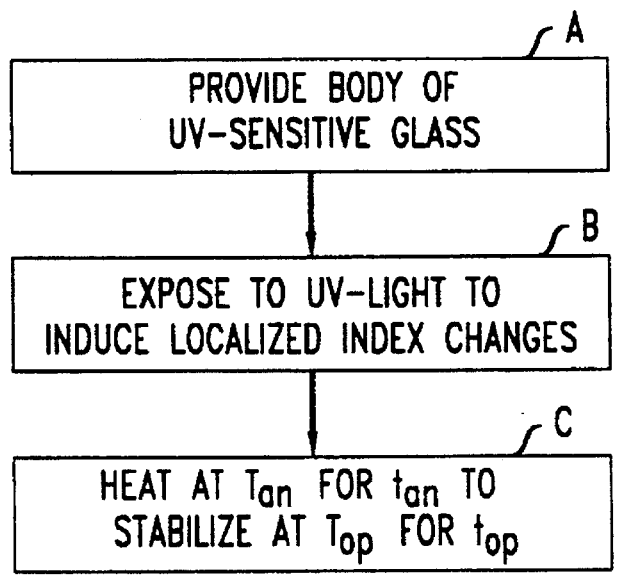
FIG. 1 is a block diagram of the steps in making an optical device having stable uv-induced index changes.
Figure 2:
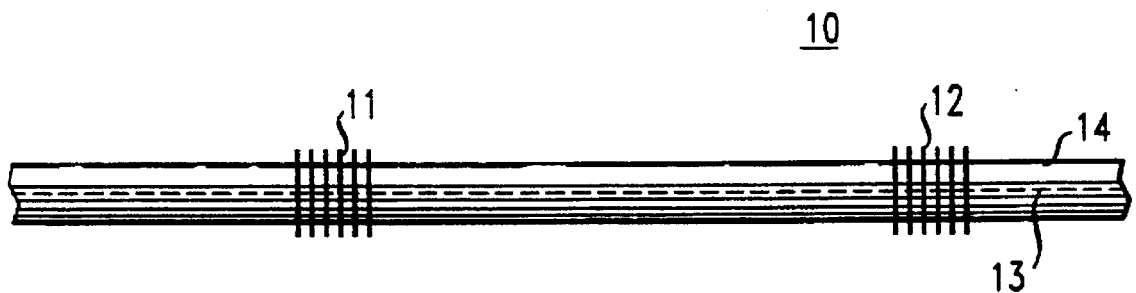
FIG. 2 is a schematic view of an exemplary optical device employing uv-induced index changes comprising a fiber optic laser.

Referring to the drawings, FIG. 1 is a block diagram of the steps involved in making a stable optical device having uv-induced index variations. As shown in block A of FIG. 1, the first step is to provide a body of uv-sensitive glass such as germanium-doped silicate. Advantageously the glass body can include other dopants as needed for its intended operation. For example, the glass body for making an optical fiber laser can be a conventionally clad optical fiber having a silicate core doped with 14 mole % germanium and 600 ppm erbium, co-doped with aluminum to minimize concentration-quenching effects. After application of overcladding, the fiber can be drawn to a 2.6 µm core diameter corresponding to a cutoff wavelength of 880 nm, all in accordance with techniques well known in the art.

The next step shown in block B of FIG. 1 is to expose a portion of the glass body to ultraviolet light in order to produce localized changes in the index of refraction. The degree of exposure can be spatially modulated by variation of exposure time, use of phase masks or use of interfering beams. For example, one or more Bragg phase gratings can be induced in the body by exposing it to interfering beams of ultraviolet light. High intensity interfering uv laser beams produce variations of the local index of refraction directly related to variations in the local beam intensity. The interfering beams thus produce a pattern of index variations having spacing corresponding to the spacing between interference peaks. These periodic variations can act as a Bragg grating to light incident upon them.

Test gratings were formed in the core of the previously described glass fiber by interfering two beams of ultraviolet light (242 nm) on the side of the fiber. The uv light was generated by frequency doubling a dye laser pumped by a XeF excimer laser producing 15 ns pulses at 30 Hz repetition rate. The interfering beams were focussed onto the fiber to a spot size of 6 mm by 50 µm with a nearly gaussian time-averaged profile. The average power was 15–20 mW, and the fiber was exposed until the gratings reached peak reflectivity of 90% (typical exposure times between 30s and 60s). The peak uv-induced index change was estimated to be $2 \times 10^{-4}$.

The next step shown in block C of FIG. 1 is to heat the exposed body for an anneal time $t_{an}$ at an anneal temperature $T_{an}$ such that the device will operate for a time $t_{op}$ at an operating temperature $T_{op}$ with a loss of only $\delta n_{op}$ in the induced index change. Because the decay in the induced index $\Delta n$ is proportional to $1/(1+At^\alpha)$ and because the device is amenable to accelerated aging, it is always possible to age the device to a state where the prescribed conditions can be met. This can be seen by reference to FIG. 3 which plots a curve proportional to $1/(1+At^\alpha)$. The experimental data were taken over a range of induced indices from 98% to 35% of the initial induced grating strength. As can be seen from FIG. 3, the amount of decay per unit time diminishes with increasing time. And because aging can be accelerated by using a temperature $T_{an}>T_{op}$, the required aging can be effected in a time $t_{an} \ll t_{op}$, i.e., $t_{an}$ can be 10% of $t_{op}$ or considerably less. An algorithm for calculating appropriate annealing times and temperatures is set forth in part II, infra, and a physical model explaining the observed behavior is set forth in part III. In essence, the device is heat treated to a point $t_1$ on the curve of FIG. 3 such that the decay between $t_1$ and $t_1+t_{op}$ is less than the required tolerance.

II. Method of the Invention (Quantitative Aspects)

Applicants have determined that the uv-induced index change $\Delta n_i$ of a glass body subjected to an operating temperature $T_{op}$ will decay in proportion to $$\frac{1}{1+At^\alpha}$$

where A is a decay prefactor which is a function of $T_{op}$ and $\alpha$ is a decay constant which is also a function of $T_{op}$. Applicants have further realized that with this model of decay, one can now prescribe a course of preoperational heat treatment which will maintain the device within a prescribed variation in index $\delta n_{op}$ for a prescribed period of time $t_{op}$ at an operating temperature $T_{op}$.

Figure 3:
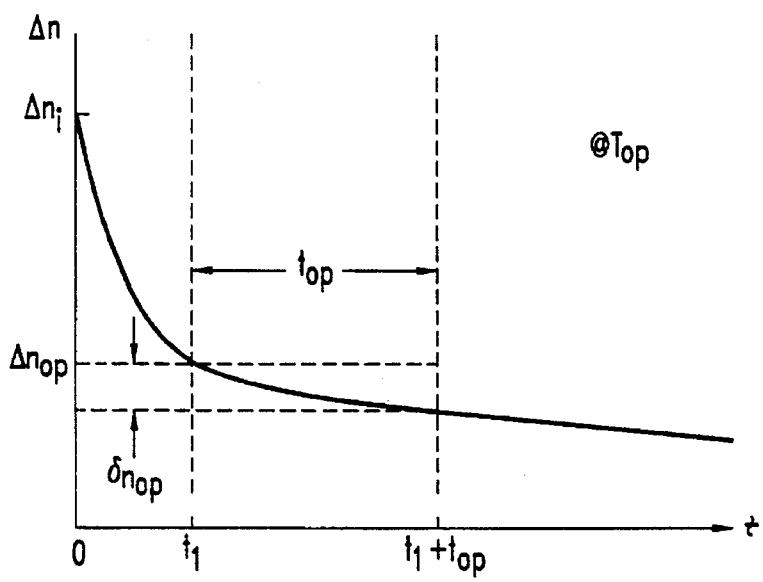
FIG. 3 is a graphical display showing the decay of uv-induced index changes as a function of time.

The ability to prescribe such treatment can be understood by reference to FIG. 3 which is a schematic graphical illustration of the decay at $T_{op}$ of the normalized uv-induced index change $\eta$ as a function of time. If $t_1$ is the time when device operation commences, then $t_1+t_{op}$ is the time when the device completes its anticipated operating life. If $\Delta n_{op}$ is the induced index change at $t_1$, then the requirement that the index decay no further than $\delta n_{op}$ during its operating life requires that $\Delta n$ be no less than $\Delta n_{op} - \delta n_{op}$ at $t_1+t_{op}$.

While $t_1$ might be an impractically long period for treating the device, applicants have further discovered that accelerated aging is possible, i.e, that by treating the device at a higher temperature $T_{an}>T_{op}$ for a shorter period of time $t_{an} \ll t_1$, the same effect can be achieved to ensure device stability.

A problem confronting a designer of an optical device employing uv-induced index change can be described as follows: "How do I process a device so that I can use it for a time at least $t_{op}$ at a temperature $T_{op}$? The device requires that the uv-induced index change not decay more than $\delta n_{op}$ over $t_{op}$. Specifically: what are the ranges of anneal times $t_{an}$ and anneal temperatures $T_{an}$ which will give the desired result".

To obtain these values for a particular glass, one should plot the empirical decay curves for at least two temperatures, e.g., $T_1$ and $T_2$, and by conventional curve fitting techniques, calculate $\alpha_1$, $\alpha_2$ and $A_1$, $A_2$ for fitting the observed curves into the form $\Delta n/(1+At^\alpha)$. It is advantageous to choose $T_1$ and $T_2$ greater than the decay anticipated operating temperature $T_{op}$ so that the parameters A and $\alpha$ can be quickly measured. The corresponding parameters at $T_{op}$ can be readily calculated by the relations:

$$A_{op}=A_o e^{aT_{op}}, \alpha_{op}=\frac{T_{op}}{T_o} \text{ where} \tag{i}$$

$$a=\frac{Ln(A_2)-Ln(A_1)}{T_2-T_1}, A_o=A_1 e^{-aT_1}=A_2 e^{-aT_2}, \text{ and } T_o=\frac{T_1}{\alpha_1}=\frac{T_2}{\alpha_2}$$

Analytically, $t_1$ can now be found by solving the equality:

$$\Delta n_{op}[A_{op}(t_1+t_{op})^{\alpha_{op}}-A_{op}t_1^{\alpha_{op}}]=\delta n_{op}[1+A_{op}(t_1+t_{op})^{\alpha_{op}}]. \tag{ii}$$

Once $t_1$ is calculated, accelerated aging conditions can be prescribed to yield a decay equivalent to that of the device at $t_1$ in FIG. 3. Specifically, we can use any combination of $T_{an}$, $t_{an}$ that solves:

$$(t_{an})^{\frac{T_{an}}{T_o}} e^{aT_{an}} = (t_1)^{\frac{T_{op}}{T_o}} e^{aT_{op}}. \tag{iii}$$

Specifically, we can use an annealing temperature $\geq T_{an}$ for an annealing time $\geq t_{an}$.

After the device is subject to heat treatment at $T_{an}$ for time $t_{an}$, it is in the same state on the curve of FIG. 3 as if it had been operated at $T_{op}$ for a period $t_1$. Its future operation at temperature $T_{op}$ for a period $t_{op}$ will produce only the small residual decay shown on the curve.

Applying these teachings to the specific example of the erbium fiber optic laser with uv-induced gratings, it should be noted that such lasers are contemplated as single mode lasers in undersea cable where economy dictates they should operate without service for many years. With only a 7% decrease in the uv-induced index changes, such a laser could switch from single mode to multiple mode operation with serious consequences to the cable system.

Figure 4:
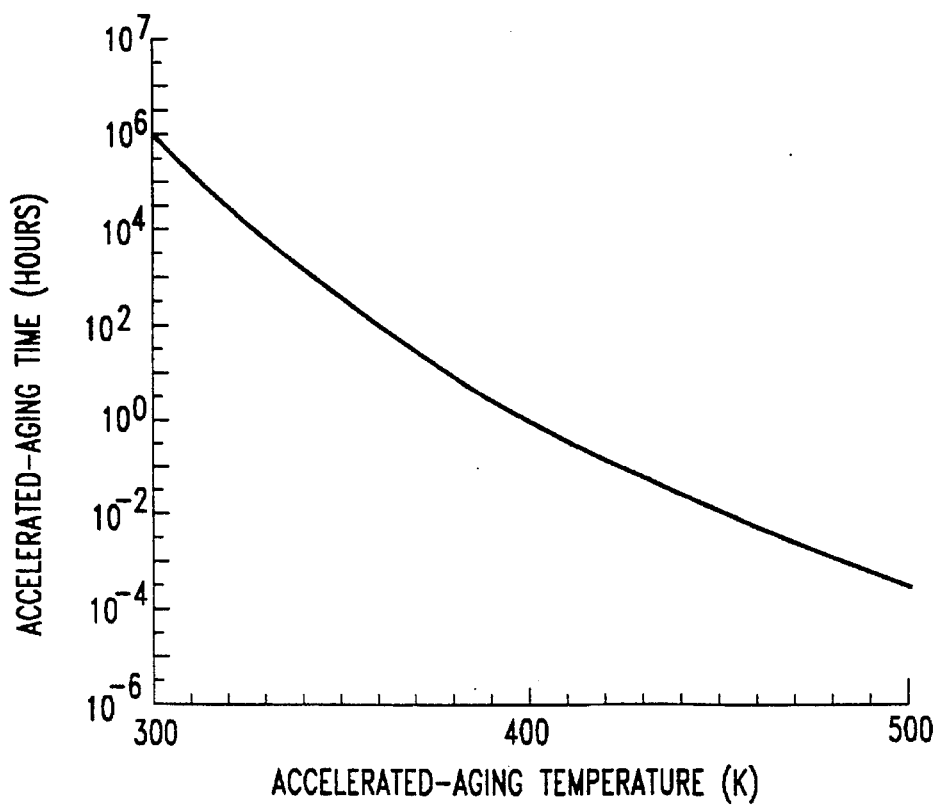
FIG. 4 plots the time at various temperatures required for aging an exemplary glass.

FIG. 4 plots the time required at various temperatures for aging the glass of the exemplary laser by an amount equivalent to 100 years decay at 300K. After such aging, the decrease in index for the next 100 years at 300K will be less than 1%.

To test these predictions, a fiber laser was annealed 48 hours at 120° C. and then operated single mode at 100° C. for a time greater than 1800 hours (equivalent to 50 years at 65° C.). The laser showed no signs of two mode operation or mode hopping during this time.

III. Physical Model of UV-Induced Index Changes

While not necessary for the invention, applicants' best current belief is that in uv-sensitive glasses electrons are excited by uv light from photosensitive defects. These excited electrons are then trapped in a continuous distribution of energy states rather than at a single trap level. The detrapping rate from any state in the continuum via thermal excitation is dependent on the temperature of the excitation and the depth of the trap state. Upon thermal release from the traps, electrons repopulate the original deep level occupied prior to uv excitation.

At a time t after trapping, the distribution of states can be separated into two groups, divided by a demarcation energy $E_d$. The first group, for which $E<E_d$, is in thermal equilibrium with the conducting states above E=0. The second group, for which $E>E_d$, is too deep to have been thermally excited by time t.

There is a unique demarcation energy $E_d$ associated with each value of induced index change. Removing a certain fraction of the induced index change corresponds to thermally depleting the traps with energies less than $E_d$, while leaving the traps with energies greater than $E_d$ unchanged.

By adjusting the temperature, the rate of index change decay can be controlled. Also, the progression of decay at any given temperature becomes much slower as time progresses. Thus accelerated aging involves inducing quick decay by increasing the temperature and then reducing the temperature once the decay process progresses to a point where further decay is sufficiently slow. Thus it is possible to stabilize a device by annealing, wiping out the unstable trap states that would cause decay by a substantial amount over the operating lifetime of the device and retaining only the stable trap states that cause only slow decay of the index change over the prescribed device lifetime.

IV. Implications of Physical Model for Device Stabilization

This model provides a general procedure for device stabilization which is applicable whenever the decay is governed by a distribution of independent activation energies. By definition, an activated process with an activation energy E occurs at a rate $v_o\exp(-E/kT)$, where T is the temperature and k is Boltzmann's constant. The attempt frequency $v_o$ is typically very rapid, in the range $10^{10}$–$10^{16}$ sec$^{-1}$ for atomic processes. Thus the demarcation energy $E_d$ (at which the rate is equal to 1/t) is simply $E_d=kTLn(v_ot)$. The basis of the procedure is that the remaining population of occupied traps is just the number initially created with $E>E_d$, and thus depends only $E_d$, not on the particular combination of T and t that produce that $E_d$.

The procedure is:

(1) The empirical decay is determined for a representative specimen of the device at two temperatures, say $T_1$ and $T_2$. The measured decays should be of sufficient duration and be close enough in temperature that they have some values of $\Delta n(t)$ in common.

(2) A value of $\Delta n_{ref}$ in common between the two decays is chosen. Since the decay depends only on $E_d$, the time $t_1$ at which the decay at $T_1$ reaches $\Delta n_{ref}$ and the corresponding time $t_2$ for the decay at $T_2$ are related by $kT_1Ln(v_ot_1)=kT_2Ln(v_ot_2)$. The value of $v_o$ is thus determined by $$v_o = \exp\left[\frac{T_1Ln(t_1) - T_2Ln(t_2)}{T_1 - T_2}\right].$$

(3) With this value of $v_o$, all decay data should obey the same functional dependence $\Delta n=f(E_d)$, where $E_d=kTLn(v_ot)$. The accuracy of this assertion can be checked by comparing data at other values of $\Delta n$ or other temperatures.

(4) The decay of an unannealed device during its lifetime can be determined from $\Delta n=f(E_{op})$ at an energy $E_{op}=kT_{op}Ln(v_ot_{op})$. Since the desired lifetime is typically much longer than can be accessed by experiment, the data for this prediction will usually come from data at shorter times but at correspondingly higher temperatures.

(5) Accelerated aging for a time $t_{an}$ at temperature $T_{an}$ can be represented by the equivalent anneal time $t_{eq}$ at the temperature $T_{op}$. $t_{eq}$ satisfies $kT_{an}Ln(v_ot_{an})=kT_{op}Ln(v_ot_{eq})$, or $t_{eq}=t_{an}(v_ot_{an})^{(T_{an}-T_{op})/T_{op}}$. Since $t_{an} \gg V_o^{-1}$, even a modest fractional increase in $T_{an}$ over $T_{op}$ result in very long $t_{eq}$. The annealing conditions should be then chosen such that $f[kT_{op}Ln(v_oT_{eq})] - f[kT_{op}Ln(v_o(t_{eq}+t_{op}))] \leq \delta n_{op}$.

SUMMARY

Thus an optical device employing ultraviolet light induced refractive index changes in a glass body can be stabilized against decay beyond a specified level by: (1) determining the amount of aging required to place the device in such condition that further aging at the anticipated operating temperature for the anticipated operating time will not produce decay of the induced index changes beyond the specified level, and (2) preannealing the device prior to operation at a higher temperature than the operating temperature for a time sufficient to place the device in the determined condition.

More specifically, if the device is designed to operate at a maximum operating temperature $T_{op}$ for an operating period $t_{op}$ with decay of the induced index changes less than $\delta n_{op}$ over the period of operation, the device can be made by: (1) providing a body of glass, (2) exposing the glass to ultraviolet light to induce the refractive index changes, (3) determining the characteristic decay curve of the induced index changes in the glass at $T_{op}$, (4) determining a point P on the decay curve for which the passage of $t_{op}$ will produce a decay of less than $\delta n$, and (5) heating the glass at an anneal temperature $T_{an} > T_{op}$ for an anneal time $t_{an} < t_{op}$ equivalent to point P on the curve.

Applicants have found that the characteristic decay curve for these devices is such that a point P can be found for any $\delta n_{op} > 0$ and that the decay mechanism in the devices is such that aging can be accelerated by using higher temperatures.

Even more specifically, the characteristic decay curve for $T_{op}$ can be expeditiously determined from the characteristic decay curves at two temperatures $T_1 > T_{op}$ and $T_2 > T_{op}$. Specifically, for $T_{op}$, $\Delta n_i$ is proportional to $1/(1+A_{op}t^{\alpha_{op}})$ where $$A_{op} = A_1e^{aT_1} = A_2e^{aT_2}, \quad \alpha_{op} = T_{op}/T_o,$$

$$a = \frac{Ln(A_2) - Ln(A_1)}{T_2 - T_1}, \quad A_o = A_1e^{-aT_1} = A_2e^{-aT_2} \text{ and } T_o = \frac{T_1}{\alpha_1} = \frac{T_2}{\alpha_2}.$$

More generally, in accordance with the physical model presented, an optical device employing an induced refractive index change $\Delta n$ in a medium where decay is governed by a distribution of independent activation energies can be stabilized for operation at $T_{op}$ for $t_{op}$ against decay beyond a specified level $\delta n_{op}$ by annealing the device at a temperature $T_{an}$ for a time $t_{an}$ such that $f[kT_{op}Ln(v_ot_{eq})]-f[kT_{op}Ln(v_o(t_{eq}+t_{op}))] \leq \delta n_{op}$.

The method is particularly useful for devices containing uv-induced Bragg gratings such as optical fiber lasers.

It is understood that the above-described embodiments are illustrative of only a few of the many possible specific embodiments which can represent applications of the principles of the invention. For example Bragg gratings made in accordance with the invention can be configured to form optical filters. Thus numerous and varied other arrangements can be readily devised in accordance with these principles by those skilled in the art without departing from the spirit and scope of the invention.

We claim:

1. A method for making an optical device employing radiation induced refractive index changes, said induced changes subject to decay with time and described for an operating temperature by a characteristic decay curve, said device designed to operate at a maximum operating temperature $T_{op}$ for an operating period $t_{op}$ with decay of the induced index changes less than $\delta n_{op}$ over the period of operation, comprising the steps of:

providing a body of glass;

exposing said glass to radiation to induce said refractive index changes;

determining the characteristic decay curve of said induced index changes in said glass for at least one temperature $T > T_{op}$ and extrapolating therefrom the characteristic decay curve for the induced index changes in said glass for $T_{op}$;

determining a point P on said decay curve for the induced index changes in said glass for $T_{op}$ for which the passage of $t_{op}$ will produce a decay of less than $\delta n_{op}$ wherein point P represents a value of decay over a period of time; and heating said glass at an anneal temperature $T_{an} > T_{op}$ for an anneal time $t_{an} < t_{op}$ to achieve a value of decay equivalent to that value represented by point P on said extrapolated curve.

2. The method of claim 1 wherein said step of determining the characteristic decay curve comprises empirically determining the characteristic decay curves of said glass for at least two temperatures T wherein the first temperature is denoted as $T_1$ and the second temperature is denoted as $T_2$ and wherein $T_1 > T_{op}$ and $T_2 > T_{op}$ and extrapolating therefrom the characteristic decay curve for the induced index changes for said glass for $T_{op}$.

3. The method of claim 1 wherein said exposing to radiation comprises exposing to ultraviolet light.

4. The method of claim 1 or 2 or 3 wherein said device comprises an optical fiber laser.

5. The method of claim 1 or 2 or 3 wherein said device comprises an optical filter.

\* \* \* \* \*